United States Patent [19]

Mattera et al.

[11] 4,402,835

[45] Sep. 6, 1983

[54] PROCESS FOR REMOVING SOLUBLE BORON COMPOUNDS FROM AQUEOUS EFFLUENTS

[75] Inventors: Adriano Mattera; Marino Quaglino, both of Novara; Pasqualino Spighi, Ancona; Massimo Stolfi, Milan, all of Italy

[73] Assignee: Istituto Guido Donegani S.p.A., Novara, Italy

[21] Appl. No.: 319,923

[22] Filed: Nov. 10, 1981

[30] Foreign Application Priority Data

Nov. 13, 1980 [IT] Italy ............................... 25941 A/80
Oct. 15, 1981 [IT] Italy ............................... 24503 A/81

[51] Int. Cl.$^3$ ................................................ C02F 1/52
[52] U.S. Cl. ..................................... 210/724; 210/726; 210/902; 210/280; 423/544; 423/554
[58] Field of Search ............... 210/702, 723, 724, 726, 210/738, 902; 423/276, 278, 279, 280, 283, 544, 554, 555

[56] References Cited

U.S. PATENT DOCUMENTS

| | | | |
|---|---|---|---|
| 2,132,585 | 10/1938 | Spittle ................................. | 423/184 |
| 2,402,959 | 7/1946 | Gustafson et al. .................. | 210/673 |
| 3,953,572 | 4/1976 | Darlington ........................... | 423/497 |
| 3,980,536 | 9/1976 | Braithwaite et al. ............... | 423/497 |
| 4,035,469 | 7/1977 | Richmond et al. ................. | 210/726 |

FOREIGN PATENT DOCUMENTS

| | | | |
|---|---|---|---|
| 622963 | 6/1961 | Canada ................................ | 423/280 |
| 2058618 | 5/1971 | France ................................ | 210/724 |
| 52-27099 | 3/1977 | Japan ................................... | 423/276 |

*Primary Examiner*—Peter A. Hruskoci
*Attorney, Agent, or Firm*—Stevens, Davis, Miller & Mosher

[57] ABSTRACT

Disclosed is a process for removing boron compounds from aqueous effluents. The effluents are contacted, under stirring, with a divalent metal sulphate $Me_I SO_4$ and a divalent metal hydroxyde $Me_{II}(OH)_2$, the sulphate-hydroxide couple being selected from the group consisting of $BeSO_4$—$Ba(OH)_2$; $BeSO_4$—$Sr(OH)_2$; $BeSO_4$—$Ca(OH)_2$; $MgSO_4$—$Ba(OH)_2$; $MgSO_4$—$Sr(OH)_2$; $MgSO_4$—$Ca(OH)_2$; $CaSO_4$—$Ba(OH)_2$; $CaSO_4$—$Sr(OH)_2$; $SrSO_4$—$Ba(OH)_2$; $ZnSO_4$—$Ba(OH)_2$; $ZnSO_4$—$Sr(OH)_2$; $ZnSO_4$—$Ca(OH)_2$; $CdSO_4$—$Ba(OH)_2$; $CdSO_4$—$Sr(OH)_2$ and $CdSO_4$—$Ca(OH)_2$. The sulphate $Me_I SO_4$ and the hydroxide $Me_{II}(OH)_2$, by reaction with each other, cause the sulphate $Me_{II}SO_4$ and the hydroxide $Me_I(OH)_2$ to precipitate.

The amount of $Me_{II}(OH)_2$ is at least stoichiometric in respect of the amount of $Me_I SO_4$ and the precipitation pH is within the range of 7 to 10 when $Me_I SO_4$ is $ZnSO_4$, and 10 to 13 in the other cases.

At the end of the precipitation the mixture is subjected to decantation and to filtration or centrifugation, thus separating the boron-containing precipitate from the purified effluents.

7 Claims, No Drawings

PROCESS FOR REMOVING SOLUBLE BORON COMPOUNDS FROM AQUEOUS EFFLUENTS

This invention relates to a process for removing soluble boron compounds from aqueous effluents.

As is well known, to remove soluble boron from aqueous effluents it is possible to cause $Mg(OH)_2$ to precipitate, which adsorbs the boron ions. This method does not give good results when the boron concentration in the effluent to be treated is low, i.e. for example 10 ppm. Actually the removal efficiency, which is about 90% when the initial concentration of boron is approximately 300 ppm, decreases to about 50% when the initial concentration is approximately 10 ppm.

Thus, it is an object of the present invention to provide a process for removing boron from aqueous effluents, and which is capable of ensuring a very low final boron content.

It is another object of this invention to provide a process capable of giving good results with both high and low initial boron contents.

These and still other objects of this invention are achieved by the herein described process according to which the aqueous effluents containing soluble boron compounds are contacted, under stirring, with a divalent metal sulphate $Me_I SO_4$ and a divalent metal hydroxide $Me_{II}(OH)_2$, the sulphate-hydroxide couple being selected from the group consisting of:
$BeSO_4$—$Ba(OH)_2$; $BeSO_4$—$Sr(OH)_2$; $BeSO_4$—$Ca(OH)_2$; $MgSO_4$—$Ba(OH)_2$; $MgSO_4$—$Sr(OH)_2$; $MgSO_4$—$Ca(OH)_2$; $CaSO_4$—$Ba(OH)_2$; $CaSO_4$—$Sr(OH)_2$; $SrSO_4$—$Ba(OH)_2$; $ZnSO_4$—$Ba(OH)_2$; $ZnSO_4$—$Sr(OH)_2$; $ZnSO_4$—$Ca(OH)_2$; $CdSO_4$—$Ba(OH)_2$; $CdSO_4$—$Sr(OH)_2$ and $CdSO_4$—$Ca(OH)_2$.

The sulphate $Me_I SO_4$ and the hydroxide $Me_{II}(OH)_2$, by reacting with each other, precipitate the sulphate $Me_{II}SO_4$ and the hydroxide $Me_I(OH)_2$.

The amount of $Me_{II}(OH)_2$ is at least stoichiometric in respect of the amount of $Me_I SO_4$, the precipitation pH ranging from 7 to 10 when $Me_I SO_4$ is $ZnSO_4$, and from 10 to 13 in the other cases.

At the conclusion of the precipitation the mixture is decanted and it is then filtered or centrifuged, thereby separating the boron-containing precipitate from the purified effluents.

The pH ranging from 7 to 10 or from 10 to 13 can be attained by employing an excess of $Me_{II}(OH)_2$ in respect of the stoichiometric ratio with $Me_I SO_4$. Otherwise it is possible to use a stoichiometric amount of $Me_{II}(OH)_2$ and to attain the desired pH by the addition of an alkaline hydroxide, for example NaOH.

The optimum amount of $Me_I SO_4$ to be used in order to achieve an efficient boron precipitation is determined experimentally. This amount depends on the water-solubility of the sulphate itself and on the water-insolubility of the hydroxide $Me_I(OH)_2$.

In the case of the $MgSO_4$—$Ba(OH)_2$ couple, it has been found that an effective precipitation is attained when the ratio:

$$\frac{\text{ppm of boron in the effluent}}{SO_4^= (g/l)}$$

is lower than or equal to 5.

The precipitation of $Me_{II}SO_4$ and $Me_I(OH)_2$ is preferably effected at a substantially constant pH value. The exact pH value which permits one to reach the best boron removal depends on the boron concentration in the water to be treated and is easily determined by means of tests on a case-by-case basis.

Of the preferred sulphate-hydroxyde couples, there may be cited: $MgSO_4$—$Ba(OH)_2$, $MgSO_4$—$Ca(OH)_2$, and $ZnSO_4$—$Ba(OH)_2$. The couple $MgSO_4$—$Ba(OH)_2$ is particularly preferred.

As the sulphate $Me_I SO_4$ and the hydroxide $Me_{II}(OH)_2$ one may use both the anhydrous compounds and the hydrated compounds. As hydrates it is possible to use, for example, $BeSO_4.4H_2O$; $MgSO_4.7H_2O$; $CaSO_4.2H_2O$; $Ba(OH)_2.8H_2O$; $Sr(OH)_2.8H_2O$; and $Ca(OH)_2.H_2O$. When the anhydrous sulphate $Me_I SO_4$ or the anhydrous hydroxide $Me_{II}(OH)_2$ are relatively insoluble in water, it is preferable to use the hydrates.

If the effluent already contains $SO_4^-$ and/or $OH^-$ and/or $Me_I^{++}$ and/or $Me_{II}^{++}$ ions, one may then use correspondingly lower amounts of $Me_I SO_4$ and/or $Me_{II}(OH)_2$.

It is not necessary to control the temperature in order to obtain a good removal of boron. The temperature employed in the process of the invention is that of the effluent to be treated, which may be ambient temperatures.

One may add first the $Me_I SO_4$, and then the $Me_{II}(OH)_2$ to the effluent. The order of addition may be also inverted.

While adding the first reagent, the effluent is stirred. Stirring is continued when the second reagent is added, i.e. during the precipitation; the precipitate is allowed to settle, the mixture decanted, and the effluent then filtered or centrifuged.

The boron content in the water to be treated may vary within a very wide range. It may be very high (for example, as high as 500 ppm), as well as very low (for example, as low as 5 ppm). In all cases the removal efficiency is very high.

When operating under the most preferred conditions, i.e. for example with the $MgSO_4$—$Ba(OH)_2$ couple, a residual content below 2 ppm is obtained; a residual content of, for example, 0.5 ppm being sometimes reached.

When the ratio $$\frac{\text{ppm of boron in the effluent}}{SO_4^= (g/l)}$$

is lower than or equal to 5, in the case of the $MgSO_4$—$Ba(OH)_2$ couple, the residual boron content in the effluent is lower than approximately 4 ppm. The lower the ratio, the lower the residual boron content in the effluent.

The following examples are given in order to better illustrate the inventive concept of the present invention:

EXAMPLE 1

1.37 g of $H_3BO_3$ were dissolved in 2 l of deionized water, thus obtaining a solution containing 120 ppm of boron.

52.5 g of $MgSO_4.7H_2O$ were then added, under stirring, to 1 liter of said solution. Successively, in about 10 minutes, 67.5 g of $Ba(OH)_2.8H_2O$ were added under stirring: the addition was effected in decreasing amounts so as to obtain a pH having an average value of $11.5\pm0.3$. The solution, in which a white precipitate formed, was allowed to decant for about 30 minutes, whereupon it was filtered.

The filtered solution was subjected to spectrophotometric analysis and revealed a boron content below 4 ppm.

Starting from boron solutions at 70 ppm (0.4 g/l of $H_3BO_3$) and 23 ppm (0.13 g/l of $H_3BO_3$), operations were conducted according to the same procedure as described hereinbefore: addition respectively of 31 g/l of $MgSO_4.7H_2O$ and 39.6 g/l of $Ba(OH)_2.8H_2O$ for the solution at 70 ppm of boron, and of 10 g/l of $MgSO_4.7H_2O$ and 12.8 g/l of $Ba(OH)_2.8H_2O$ for the solution at 23 ppm of boron.

After decantation and filtration, the boron content in both the solutions decreased to below 4 ppm.

EXAMPLE 2

1.37 g of $H_3BO_3$ were dissolved in 2 liters of deionized water, thus obtaining a solution containing 120 ppm of boron.

77.5 g of $MgSO_4.7H_2O$ were added, under stirring, to 1 liter of such solution. Successively, 98.5 g of $Ba(OH)_2.8H_2O$ were added, under stirring, in about 10 minutes: the addition was effected in decreasing amounts in order to reach an average pH value of $11.5 \pm 0.3$. The solution was allowed to decant for about 30 minutes, whereupon it was filtered.

The filtered solution, thereupon subjected to spectrophotometric analysis, revealed a boron content lower than 2 ppm.

When starting from solutions having 70 ppm and 23 ppm of boron, obtained by dissolving, in 1 liter of deionized water, 0.4 g and 0.13 g of $H_3BO_3$, respectively, 45 g of $MgSO_4.7H_2O$ and 57.6 g of $Ba(OH)_2.8H_2O$ were added to the solution at 70 ppm of boron, and 15 g of $MgSO_4.7H_2O$ and 19.5 g of $Ba(OH)_2.8H_2O$ to the solution at 23 ppm of boron.

Both of these solutions, after decantation and filtration, revealed, on spectrophotometric analysis, a boron content lower than or equal to 2 ppm.

EXAMPLE 3

0.26 g of $H_3BO_3$ was dissolved in 2 l of deionized water, thus producing a solution containing 23 ppm of boron.

32.3 g of $MgSO_4.7H_2O$ were added, under stirring, to 1 liter of such solution.

Successively, 10.4 g of $Ca(OH)_2$ was added, under stirring, in about 10 minutes. The addition was effected in decreasing amounts so as to reach an average pH value of $11.3 \pm 0.3$.

The solution, in which a white precipitate formed, was allowed to decant for about 30 minutes and was then filtered.

The filtered solution, when subjected to spectrophotometric analysis, revealed a boron content of approximately 10 ppm.

EXAMPLE 4

By operating according to the procedure of Example 3, 15.3 g of $MgSO_47H_2O$ and 4.6 g of $Ca(OH)_2$ were added successively to a solution containing 23 ppm of boron to obtain a pH of $11.3 \pm 0.3$.

The purified solution had a boron content of about 12 ppm.

EXAMPLE 5

By operating according to the procedure of Example 3, 90.4 g of $ZnSO_4.7H_2O$ and 98.5 g of $Ba(OH)_2.8H_2O$ were added to a solution containing 120 ppm of boron to obtain a pH of $8.8 \pm 0.3$.

The purified solution had a boron content of about 6 ppm.

What is claimed is:

1. A process for removing soluble boron compounds from an aqueous effluent comprising:

contacting the aqueous effluent, while stirring, with effective amounts of a divalent metal sulphate, $Me_ISO_4$, and a divalent metal hydroxide, $Me_{II}(OH)_2$, couple so that the divalent metal sulphate, $Me_ISO_4$, and the divalent metal hydroxide, $Me_{II}(OH)_2$, react with each other and form a precipitate containing a sulphate, $Me_{II}SO_4$, a hydroxide, $Me_I(OH)_2$, and said soluble boron compounds, said $Me_{II}(OH)_2$ is added in amounts which are at least stoichiometric with the amount of $Me_ISO_4$, said sulphate-hydroxide couple is selected from the group consisting of $BeSO_4$—$Ba(OH)_2$, $BeSO_4$—$Sr(OH)_2$, $BeSO_4$—$Ca(OH)_2$, $MgSO_4$—$Ba(OH)_2$, $MgSO_4$—$Ca(OH)_2$, $CaSO_4$—$Ba(OH)_2$, $CaSO_4$—$Sr(OH)_2$, $SrSO_4$—$Ba(OH)_2$, $ZnSO_4$—$Ba(OH)_2$, $ZnSO_4$—$Sr(OH)_2$, $ZnSO_4$—$Ca(OH)_2$, $CdSO_4$—$Ba(OH)_2$, $CdSO_4$—$Sr(OH)_2$, and $CdSO_4$—$Ca(OH)_2$, and said precipitate is formed at a pH ranging from 7 to 10 when $Me_ISO_4$ is $ZnSO_4$ and from 10 to 13 when $Me_ISO_4$ is selected from the group consisting of $BeSO_4$, $MgSO_4$, $CaSO_4$, $SrSO_4$, and $CdSO_4$;

allowing the effluent to decant after precipitation; and filtering or centrifuging the effluent to separate the boron-containing precipitate and produce a purified effluent.

2. The process accordng to claim 1, wherein the value of the precipitation pH is achieved by adding $Me_{II}(OH)_2$ in amounts exceeding the stoichiometric ratio relative to the $Me_ISO_4$.

3. The process according to claim 1, wherein the $Me_{II}(OH)_2$ is added in stoichiometric amounts with respect to the amount of $Me_ISO_4$ and wherein the value of the pH at precipitation is achieved by adding an alkaline hydroxide.

4. The process according to claim 1, wherein the sulphate-hydroxide couple is selected from the group consisting of $MgSO_4$—$Ba(OH)_2$; $MgSO_4$—$Ca(OH)_2$; and $ZnSO_4$—$Ba(OH)_2$.

5. The process according to claim 1, wherein the sulphate-hydroxide couple is $MgSO_4$—$Ba(OH)_2$.

6. The process according to claim 1, wherein the divalent metal sulphate $Me_ISO_4$, is employed in the form of a hydrate thereof.

7. The process according to claim 1, wherein the divalent metal hydroxide, $Me_{II}(OH)_2$ is employed in the form of a hydrate thereof.

* * * * *

UNITED STATES PATENT AND TRADEMARK OFFICE
CERTIFICATE OF CORRECTION

PATENT NO. : 4,402,835
DATED : September 6, 1983
INVENTOR(S) : MATTERA, et al

It is certified that error appears in the above-identified patent and that said Letters Patent is hereby corrected as shown below:

Column 4, line 17, for "couple" read -- coupled --.

Column 4, line 26, at the end of the line after "$MgSO_4$-$Ba(OH)_2$," insert -- $MgSO_4$-$Sr(OH)_2$,--.

Signed and Sealed this

Tenth Day of April 1984

[SEAL]

Attest:

GERALD J. MOSSINGHOFF

Attesting Officer    Commissioner of Patents and Trademarks